(12) United States Patent
Wang et al.

(10) Patent No.: US 10,410,053 B2
(45) Date of Patent: Sep. 10, 2019

(54) METHOD, APPARATUS, SYSTEM, AND STORAGE MEDIUM FOR DETECTING INFORMATION CARD IN IMAGE

(71) Applicant: TENCENT TECHNOLOGY (SHENZHEN) COMPANY LIMITED, Shenzhen (CN)

(72) Inventors: Chengjie Wang, Shenzhen (CN); Hui Ni, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 3 days.

(21) Appl. No.: 15/715,579

(22) Filed: Sep. 26, 2017

(65) Prior Publication Data

US 2018/0018512 A1 Jan. 18, 2018

Related U.S. Application Data

(63) Continuation of application No. PCT/CN2016/083100, filed on May 24, 2016.

(30) Foreign Application Priority Data

Dec. 7, 2015 (CN) .......................... 2015 1 0890003

(51) Int. Cl.
*G06K 9/00* (2006.01)
*G06K 9/32* (2006.01)
*G06K 9/46* (2006.01)

(52) U.S. Cl.
CPC ..... *G06K 9/00463* (2013.01); *G06K 9/00483* (2013.01); *G06K 9/3216* (2013.01); *G06K 9/3275* (2013.01); *G06K 9/4604* (2013.01)

(58) Field of Classification Search
None
See application file for complete search history.

(56) References Cited

U.S. PATENT DOCUMENTS 8,837,833 B1 * 9/2014 Wang ................... G06K 9/3283
382/182
9,754,163 B2 * 9/2017 Segalovitz ......... G06K 9/00442
(Continued)

FOREIGN PATENT DOCUMENTS

CN 1794267 A 6/2006
CN 101414356 A 4/2009
(Continued)

OTHER PUBLICATIONS

Jagannathan, L., and C. V. Jawahar. "Perspective correction methods for camera based document analysis." Proc. First Int. Workshop on Camera-based Document Analysis and Recognition. 2005. (Year: 2005).*

(Continued)

*Primary Examiner* — Andrae S Allison
(74) *Attorney, Agent, or Firm* — Anova Law Group, PLLC (57) ABSTRACT

A method for detecting an information card in an image is provided. The method includes performing a line detection to obtain two endpoints of a line segment corresponding to each of four sides of the information card; generating, a linear equation of the side; obtaining coordinates of four intersection points of the four sides of the information card; mapping the coordinates of the four intersection points to four corners of a rectangular box of the information card, to obtain a perspective transformation matrix; performing perspective transformation on image content encircled by four straight lines represented by the four linear equations to provide transformed image content; forming a gradient template according to a layout of information content on the (Continued)

information card; and using the gradient template to match with the transformed image content and determining whether the image content is a correct information card.

19 Claims, 4 Drawing Sheets

(56) References Cited

U.S. PATENT DOCUMENTS

| | | | | |
|---|---|---|---|---|
| 2008/0170784 A1* | 7/2008 | Guerzhoy | ................ | G06T 7/12 382/173 |
| 2009/0185715 A1* | 7/2009 | Hofhauser | ........... | G06K 9/6206 382/103 |
| 2011/0285873 A1* | 11/2011 | Showering | ............. | G06K 9/228 348/231.99 |
| 2012/0284185 A1* | 11/2012 | Mettler | .................. | G06Q 40/02 705/44 |
| 2013/0004076 A1* | 1/2013 | Koo | ........................ | G06K 9/228 382/176 |
| 2015/0003733 A1* | 1/2015 | Wang | ................... | G06K 9/3283 382/182 |

FOREIGN PATENT DOCUMENTS

| | | |
|---|---|---|
| CN | 101488187 A | 7/2009 |
| CN | 101625760 A | 1/2010 |
| CN | 102306415 A | 1/2012 |
| CN | 103106663 A | 5/2013 |
| CN | 103488984 A | 1/2014 |
| CN | 103679638 A | 3/2014 |
| CN | 103679702 A | 3/2014 |
| CN | 104217444 A | 12/2014 |
| CN | 104268872 A | 1/2015 |
| CN | 104933401 A | 9/2015 |
| CN | 105046184 A | 11/2015 |
| CN | 105117680 A | 12/2015 |
| JP | H1055446 A | 2/1998 |

OTHER PUBLICATIONS

Mollah, A. F., et al. "A fast skew correction technique for camera captured business card images." India Conference (INDICON), 2009 Annual IEEE. IEEE, 2009. (Year: 2009).*
The World Intellectual Property Organization (WIPO) International Search Report for PCT/CN2016/083100 dated Aug. 29, 2016 6 Pages (including translation).
The State Intellectual Property Office of the People's Republic of China (SIPO) Office Action 1 for 201510890003.1 Jan. 29, 2019 12 Pages (including translation).

* cited by examiner

METHOD, APPARATUS, SYSTEM, AND STORAGE MEDIUM FOR DETECTING INFORMATION CARD IN IMAGE

RELATED APPLICATIONS

This application is a continuation application of PCT Patent Application No. PCT/CN2016/083100, filed on May 24, 2016, which claims priority to Chinese Patent Application No. 201510890003.1, entitled "METHOD, APPARATUS, AND SYSTEM FOR DETECTING INFORMATION CARD IN IMAGE" filed on Dec. 7, 2015, the entire content of all of which is incorporated herein by reference.

FIELD OF THE TECHNOLOGY

This application relates to an image processing technology, in particular, to a method, an apparatus, a system, and a storage medium for detecting an information card in an image.

BACKGROUND OF THE DISCLOSURE

Identity verification or information exchange is often required when using Internet applications. For example, when using an Internet financial application, users may need to upload an identity card image for identity check or identity theft preservation. In another example, when using certain lifestyle applications, images such as a social security card, a health insurance card, or a driving license of a user may need to be uploaded for verification or preservation.

Currently, information card images, such as an identity card, a social security card, a health insurance card, or a driving license, are manually detected at the most. It is therefore desirable to provide solutions for detecting these information card images.

A conventional method for detecting an identity card in an image includes: forming an identity card image template, and searching for an image in a template matching manner, to detect the identity card in the image.

This template matching method, however, requires high-level cooperation from users. That is, full cooperation of a user is required in a user interaction process to ensure that an identity card in the image has substantially zero deflection from preset size and angle. Additionally, the entire image content needs to be scanned for the template matching, which is slow in speed and may generate non-matching results.

SUMMARY

Embodiments of this application provide a method for detecting an information card in an image, and further provide an apparatus, a system, and a storage medium for detecting an information card in an image, to lower a requirement for high-level of user cooperation and to improve a processing speed.

An aspect of the present disclosure provides a method for detecting an information card in an image. The method includes: performing a line detection in an information card image, to obtain two endpoints of a line segment corresponding to each of four sides of the information card; generating, according to the two endpoints of the line segment corresponding to each side, a linear equation corresponding to the side; obtaining coordinates of four intersection points according to the linear equations corresponding to the four sides of the information card; mapping the coordinates of the four intersection points to four corners of a rectangular box of the information card, to obtain a perspective transformation matrix; performing perspective transformation on image content encircled by four straight lines represented by the four linear equations according to the perspective transformation matrix to provide transformed image content; forming a gradient template according to a layout of information content on the information card; and using the gradient template to match with the transformed image content and determining, according to a matching result, whether the image content is a correct information card.

Another aspect of the present disclosure provides an apparatus for detecting an information card in an image. The apparatus includes: a memory; and a processor coupled to the memory and configured for: performing a line detection in an information card image, to obtain two endpoints of a line segment corresponding to each of four sides of the information card; generating, according to the two endpoints of the line segment corresponding to each side, a linear equation corresponding to the side; obtaining coordinates of four intersection points according to the linear equations corresponding to the four sides of the information card; mapping the coordinates of the four intersection points to four corners of a rectangular box of the information card, to obtain a perspective transformation matrix; performing perspective transformation on image content encircled by four straight lines represented by the four linear equations according to the perspective transformation matrix to provide transformed image content; forming a gradient template according to a layout of information content on the information card; and using the gradient template to match with the transformed image content and determining, according to a matching result, whether the image content is a correct information card.

Another aspect of the present disclosure provides a non-transitory computer-readable storage medium, containing computer-executable program instructions for, when executed by a processor, performing a method for detecting an information card in an image. The method includes: performing a line detection in an information card image, to obtain two endpoints of a line segment corresponding to each of four sides of the information card; generating, according to the two endpoints of the line segment corresponding to each side, a linear equation corresponding to the side; obtaining coordinates of four intersection points according to the linear equations corresponding to the four sides of the information card; mapping the coordinates of the four intersection points to four corners of a rectangular box of the information card, to obtain a perspective transformation matrix; performing perspective transformation on image content encircled by four straight lines represented by the four linear equations according to the perspective transformation matrix to provide transformed image content; forming a gradient template according to a layout of information content on the information card; and using the gradient template to match with the transformed image content and determining, according to a matching result, whether the image content is a correct information card.

BRIEF DESCRIPTION OF THE DRAWINGS

To describe the technical solutions in the embodiments of this application more clearly, the following briefly introduces the accompanying drawings. Apparently, the accompanying drawings in the following description show merely some embodiments of this application, and a person of ordinary skill in the art may derive other drawings from these accompanying drawings without creative efforts.

DESCRIPTION OF EMBODIMENTS

In embodiments of this application, to lower a requirement for high level user cooperation, it has been considered that an information card may deform in a photographed information card image. For example, a rectangular information card may become trapezoidal in an information card image. Therefore, before image content of the information card is detected, a dimension thereof should be first calibrated, and then the image content is detected.

To make the objective, technical solutions, and advantages of this application clearer, this application is further described in detail below according to various embodiments.

For concise and intuitive descriptions, technical solutions of this application are described below using representative embodiments. A large quantity of details in the embodiments is merely used for helping understand the solutions of this application. However, apparently, when being implemented, technical solutions of this application may not be limited to these details. To avoid unnecessarily blurring the solutions of this application, some embodiments are not described in great detail, only with frames provided.

In the following text, the term "include" refers to "include but is not limited to", and the term "according to . . . " refers to "according to at least . . . , but not being limited only to according to . . . ". When a quantity of components is not particularly pointed out, this means that there may be one or more components, or may be at least one component.

Figure 1:
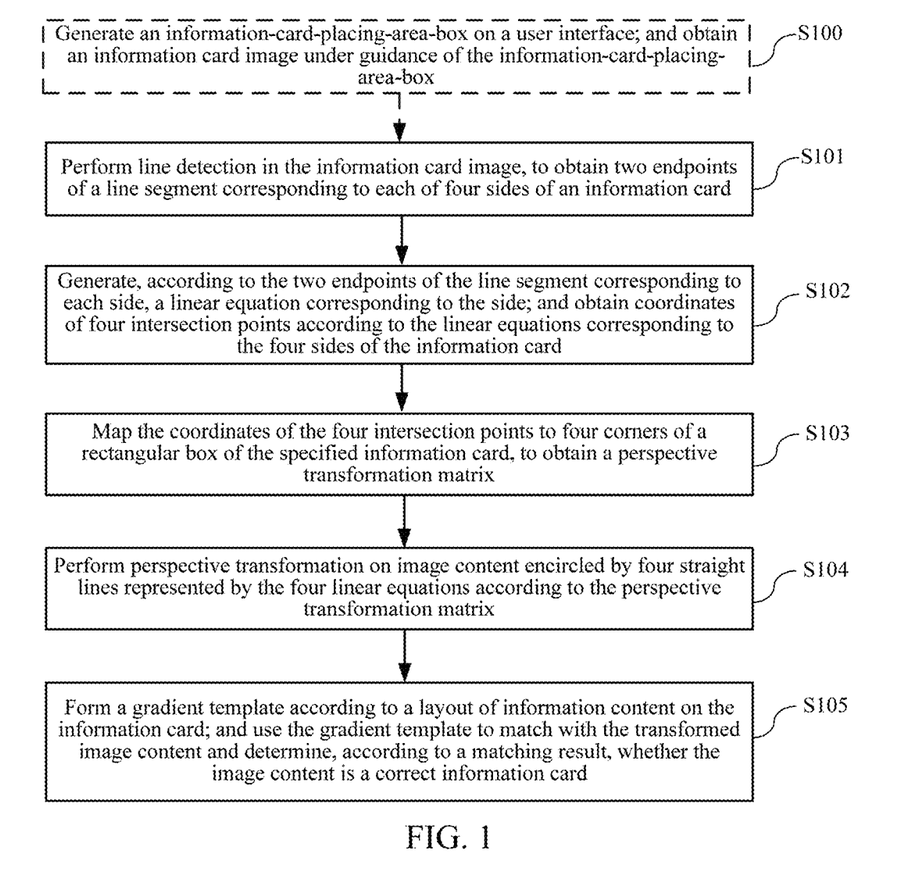
FIG. 1 is an exemplary flowchart of a method for detecting an information card in an image according to embodiments of this application.

FIG. 1 is an exemplary flowchart of a method for detecting an information card in an image according to embodiments of this application. As shown in FIG. 1, the method may include the following processes.

In S101: Performing line detection in an information card image, to obtain two endpoints of a line segment corresponding to each of four sides of an information card.

Considering the impact of a resolution of the information card image and/or light rays during photographing, when line detection is performed in the information card image, an entire line segment of each side in the four sides of the information card is not always obtained. For a side, only a part of the side may be detected, or an end of the detected line segment exceeds a part of the side. Nevertheless, at least one part thereof overlaps with the side.

In one embodiment, for each detected line segment, two endpoints of the line segment may be recorded.

In various embodiments, the information card image may include, but be not limited to, a social security card, a health insurance card, a driving license, and an identity card.

In S102: Generating, according to the two endpoints of the line segment corresponding to each side, a linear equation corresponding to the side; and obtain coordinates of the four intersection points according to the linear equations corresponding to the four sides of the information card.

Considering that the detected line segment in S101 may be shorter than a side of the information card, the linear equations are first calculated according to the endpoints of the line segment, and then the coordinates of the four intersection points of the card in the information card image are calculated according to the four linear equations.

In S103: Mapping the coordinates of the four intersection points to four corners of a rectangular box of the specified information card, to obtain a perspective transformation matrix.

In one embodiment, a rectangular box of the information card may be first specified, and sizes of the rectangular box and an actual information card have a specified ratio relationship. Thus, by using a perspective transformation method, the coordinates of the four intersection points obtained in S102 are mapped to the four corners of the rectangular box, to obtain the perspective transformation matrix.

In S104: Performing perspective transformation on image content encircled by four straight lines represented by the four linear equations according to the perspective transformation matrix to provide transformed image content.

In this step, perspective transformation is performed, by using the perspective transformation matrix obtained in S103, on the image content encircled by the four straight lines represented by the four linear equations, to implement dimension calibration of a deformed information card image. The requirement on user cooperation may be lowered by means of dimension calibration.

In S105: forming a gradient template according to a layout of information content on the information card; and using the gradient template to match with the transformed image content and determining, according to a matching result, whether the image content is a correct information card.

Various methods may be used for forming a gradient template. One exemplary method is illustrated as follows.

Figure 2:
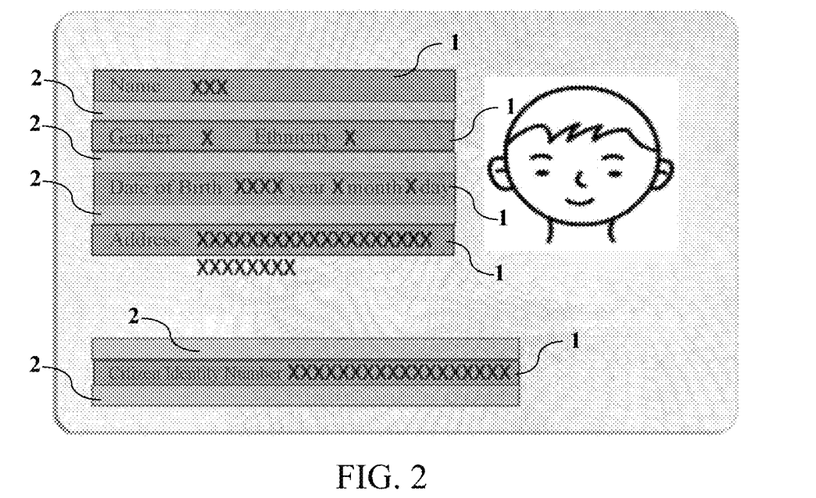
FIG. 2 is a schematic layout diagram of information content of an identity card according to embodiments of this application.

Considering an information card corresponding to a type, information content on the information card is usually fixedly laid out. For example, FIG. 2 shows layout of information content of an identity card. As shown in FIG. 2, an area in which the identity card presents a name, a gender, a people, a date of birth, an address, a citizen identity number, and the like is an information content area, and an area in which the identity card does not present any information is a non-information content area.

Therefore, when the gradient template is formed, it is considered that all or a part of the information content area in the information card is used as a first gradient area, and all or a part of the non-information content area in the information card is used as a second gradient area. For example, in FIG. 2, an area indicated by label 1 is determined as the first gradient area, and an area indicated by a label 2 is determined as the second gradient area. Afterwards, a gradient threshold for detecting an information card in an image may be determined according to an average gradient of the first gradient area and an average gradient of the second gradient area, respectively. That is, a first gradient threshold is determined according to the information content area (e.g., the first gradient area) specified on the information card, and a second gradient threshold is determined according to the non-information content area (e.g., the second gradient area) on the information card. At this point, the gradient template is completely formed.

Correspondingly, according to the layout of the information content on the information card, a first area corresponding to the first gradient area and a second area corresponding to the second gradient area may be first determined according to a ratio in the image content, after the perspective transformation has been performed thereon.

Average gradient value calculation is performed on the image content within the first area, to obtain a first average gradient value; and average gradient value calculation is performed on the image content within the second area, to obtain a second average gradient value. Whether the first average gradient value is greater than the first gradient threshold and whether the second average gradient value is less than the second gradient threshold are determined. It may be determined that the transformed image content is a correct information card when the first average gradient value is greater than the first gradient threshold, and the second average gradient value is less than the second gradient threshold. Otherwise, it is determined that the transformed image content is not a correct information card.

In one application example, it is found that a processing speed of the foregoing gradient matching method, as compared with a template matching method, may be improved by about 10 times, and incorrect detection does not occur in the gradient matching method.

To further improve a detection speed, the following S100 may be further performed before S101: generating, on a user interface, an information-card-placing-area-box, configured to instruct a user to place an information card in the area box for photographing; and obtaining the information card image under guidance of the information-card-placing-area-box.

Figure 3:
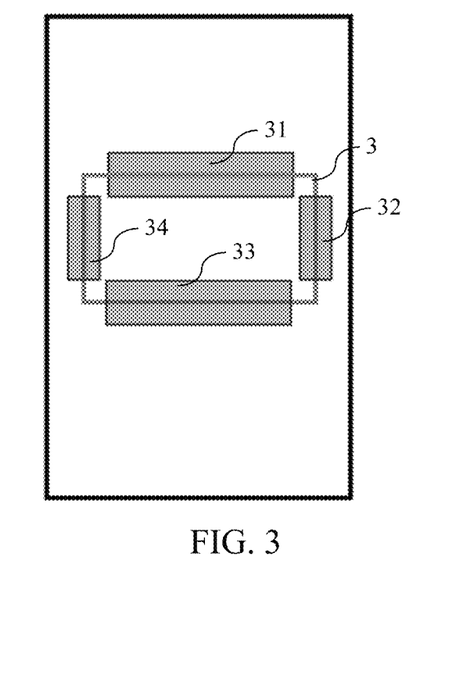
FIG. 3 is a schematic diagram for instructing an information-card-placing-area-box according to embodiments of this application.

FIG. 3 is a schematic diagram for instructing an exemplary information-card-placing-area-box according to embodiments of this application. As shown in FIG. 3, a rectangular box indicated by label 3 is the exemplary information-card-placing-area-box.

Correspondingly, in S101, line detection may be performed near a location corresponding to the information-card-placing-area-box. Considering trembling or errors when a user places the card, a detection range, for example, areas indicated by labels 31, 32, 33, and 34 as shown in FIG. 3, is disposed at each side corresponding to the information-card-placing-area-box. That is, in S101, line detection may be performed in the information card image within a predetermined range of each side corresponding to the information-card-placing-area-box, so as to further improve the detection speed.

In an application example, by means of the technical solutions in this embodiment, that the information card has an offset within ±5 degrees with a predetermined straight line in the image can be processed, and a dimension error within 10% with a predetermined size can be processed.

In some embodiments, the method may be entirely completed at a client side. For example, an application (APP) at the client side may be generated, and then the client performs S101 to S105. In an embodiment when S100 is included, the client performs S100 to S105.

In other embodiments, the method may be mainly completed at a server side. In this case, the client may be mainly responsible for uploading an information card image of a user to the server side, and the server side performs S101 to S105. Certainly, when S100 is included, S100 is also completed at the client side. In this case, for the server side, the information card image is an information card image that is obtained under guidance of an information-card-placing-area-box. The server may perform line detection in the information card image within a predetermined range of each side corresponding to the information-card-placing-area-box.

Various embodiments further include an apparatus used for executing the corresponding methods. Details about the apparatus corresponding to the disclosed methods are not repeated.

Figure 4:
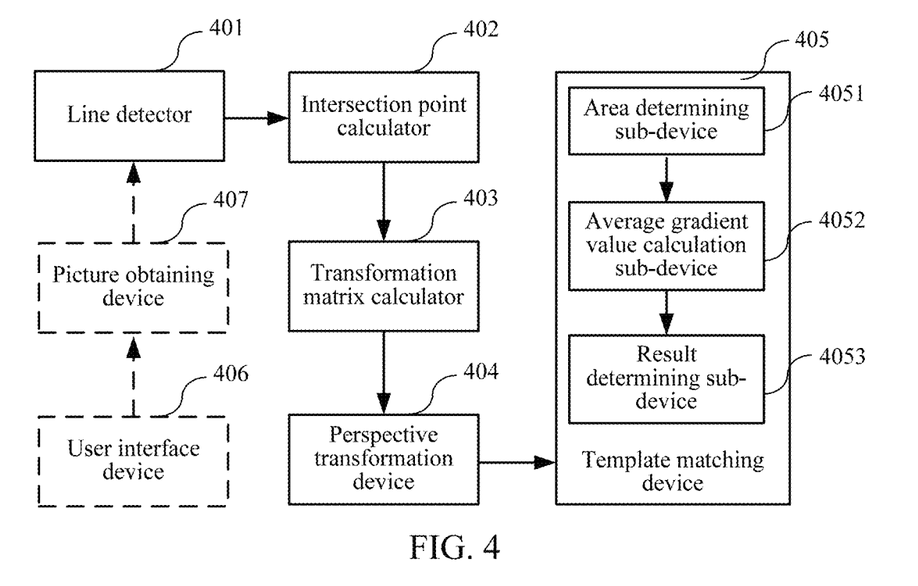
FIG. 4 is an exemplary structural diagram of an apparatus for detecting an information card in an image according to embodiments of this application.

FIG. 4 is an exemplary structural diagram of an apparatus for detecting an information card in an image according to embodiments of this application. As shown in a solid line part in FIG. 4, the apparatus may include: a line detector 401, an intersection point calculator 402, a transformation matrix calculator 403, a perspective transformation device 404, and a template matching device 405.

The line detector 401 is configured to perform line detection in an information card image, to obtain two endpoints of a line segment corresponding to each of four sides of the information card.

The intersection point calculator 402 is configured to: generate, according to the two endpoints of the line segment corresponding to each side, a linear equation corresponding to the side; and obtain coordinates of the four intersection points according to the linear equations corresponding to the four sides of the information card.

The transformation matrix calculator 403 is configured to map the coordinates of the four intersection points to four corners of a rectangular box of the information card, to obtain a perspective transformation matrix.

The perspective transformation device 404 is configured to perform perspective transformation on image content encircled by four straight lines represented by the four linear equations according to the perspective transformation matrix to provide transformed image content.

The template matching device 405 is configured to: form a gradient template according to a layout of information content on the information card; and use the gradient template to match with the transformed image content and determining, according to a matching result, whether the image content is a correct information card.

In one embodiment, the gradient template that is produced according to the layout of the information content on the information card includes: a first gradient area corresponding to a specified information content area and a second gradient area corresponding to a specified non-information content area that are determined according to the layout of the information content on the information card; and a first gradient threshold that is determined according to an average gradient of the first gradient area and a second gradient threshold that is determined according to an average gradient of the second gradient area. Correspondingly, the template matching device 405 may include: an area determining sub-device 4051, an average gradient value calculation sub-device 4052, and a result determining sub-device 4053.

The area determining sub-device 4051 is configured to determine, according to the layout of the information content on the information card, a first area corresponding to the first gradient area and a second area corresponding to the second gradient area according to a ratio in the transformed image content forming.

The average gradient value calculation sub-device 4052 is configured to: perform average gradient value calculation on the image content within the first area, to obtain a first average gradient value; and perform average gradient value calculation on the image content within the second area, to obtain a second average gradient value.

The result determining sub-device 4053 is configured to: determine that the transformed image content is a correct information card when the first average gradient value is greater than the first gradient threshold, and the second average gradient value is less than the second gradient threshold; and otherwise, determine that the transformed image content is not a correct information card.

The apparatus shown in the solid line part of FIG. 4 may be implemented at the client side or may be implemented at the server side. When the apparatus is implemented at the server side, the client may upload the obtained information card image of the user to the server side.

Further, the apparatus may further include: a user interface device 406 and an image obtaining device 407 that are shown in a dashed line part.

The user interface device 406 is configured to generate an information-card-placing-area-box, configured to instruct a user to place an information card in the area box for photographing.

The image obtaining device 407 is configured to obtain an information card image.

The user interface device 406 and the image obtaining device 407 that are shown in the dashed line part in FIG. 4 are implemented at the client side.

Correspondingly, for a case when the apparatus shown in the solid line part of FIG. 4 is implemented at the server side, the client side uploads to the server side the information card image that is obtained under guidance of an information-card-placing-area-box. The server side may correspondingly perform line detection in the information card image within a predetermined range of each side corresponding to the information-card-placing-area-box, to improve a detection speed. In this case, the client side may further include a sending device (not shown), configured to send to the server the information card image obtained by the image obtaining device 407. Correspondingly, the server side may further include a receiving device (not shown), configured to receive the information card image and provide the information card image to the line detector 401.

Figure 5:
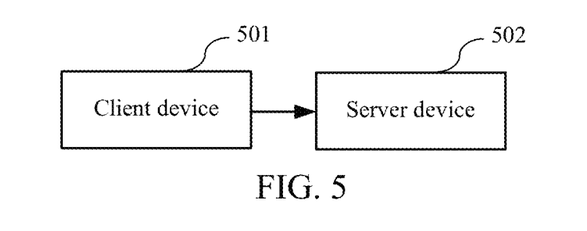
FIG. 5 is an exemplary structural diagram of a system for detecting an information card in an image according to embodiments of this application.

FIG. 5 is an exemplary structural diagram of a system for detecting an information card in an image according to embodiments of this application. As shown in FIG. 5, the system includes: a client device 501 and a server device 502.

The client device 501 is configured to provide an information card image to the server device 502.

The server device 502 is configured to: perform line detection in an information card image, to obtain two endpoints of a line segment corresponding to each of four sides of the information card; generate, according to the two endpoints of the line segment corresponding to each side, a linear equation corresponding to the side; obtain coordinates of the four intersection points according to the linear equations corresponding to the four sides of the information card; map the coordinates of the four intersection points to four corners of a rectangular box of the information card, to obtain a perspective transformation matrix; perform perspective transformation on image content encircled by four straight lines represented by the four linear equations according to the perspective transformation matrix to provide transformed image content; and form a gradient template according to a layout of information content on the information card; and use the gradient template to match with the transformed image content and determine, according to a matching result, whether the image content is a correct information card.

In an embodiment, the gradient template that is produced according to the layout of the information content on the information card includes: a first gradient area corresponding to a specified information content area and a second gradient area corresponding to a specified non-information content area that are determined according to the layout of the information content on the information card. A first gradient threshold is determined according to an average gradient of the first gradient area and a second gradient threshold is determined according to an average gradient of the second gradient area.

Correspondingly, the server device 502 may be configured to: determine, according to the layout of the information content on the information card, a first area corresponding to the first gradient area and a second area corresponding to the second gradient area in proportion in the transformed image content forming; perform average gradient value calculation on the image content within the first area, to obtain a first average gradient value; perform average gradient value calculation on the image content within the second area, to obtain a second average gradient value; determine that the transformed image content is a correct information card when the first average gradient value is greater than the first gradient threshold, and the second average gradient value is less than the second gradient threshold; and otherwise, determine that the transformed image content is not a correct information card.

In an embodiment, the client device 501 may be configured to: generate, on a user interface, an information-card-placing-area-box, configured to instruct a user to place an information card in the area box for photographing; obtain the information card image under guidance of the information-card-placing-area-box; and upload the obtained information card image to the server device 502. Correspondingly, the server device 502 may be configured to perform line detection in the information card image within a predetermined range of each side corresponding to the information-card-placing-area-box.

In addition, each embodiment of this application may be implemented by a data processing program that is executed by a data processing device such as a processor or a computer. Apparently, the data processing program constitutes exemplary embodiments of the present application. In addition, generally a data processing program stored in a storage medium is executed by directly reading the program from the storage medium or by installing or copying the program to a storage device (such as a hard disk or memory) of the data processing device. Therefore, such a storage medium also constitutes exemplary embodiments of the present application. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

For example, various embodiments may include a non-transitory computer-readable storage medium containing computer-executable program instructions (e.g., the data processing program) for, when executed by a processor, performing the disclosed methods for detecting an information card in an image.

Figure 6:
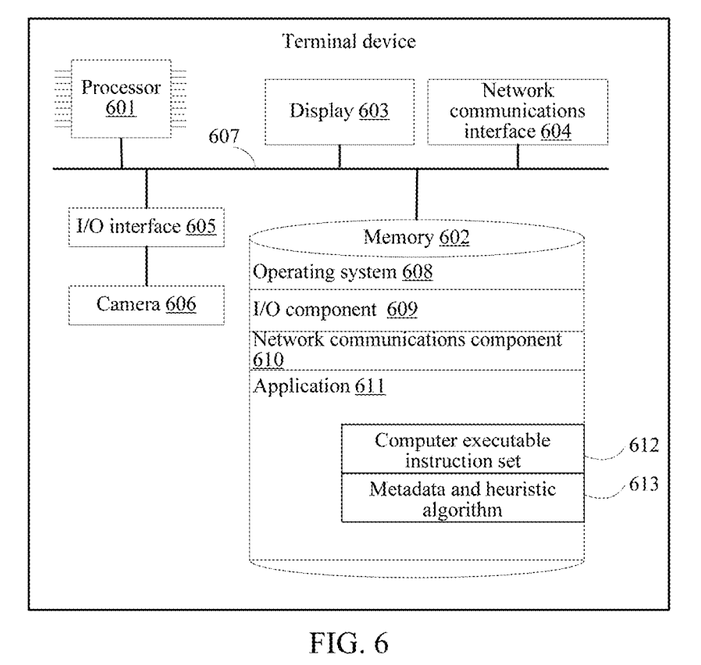
FIG. 6 is a schematic structural diagram of a client device according to embodiments of this application.

FIG. 6 is a schematic structural diagram of a client device according to an embodiment of this application. As shown in FIG. 6, the client device may be configured to perform the method in FIG. 1 and the apparatus in FIG. 4. As shown in FIG. 6, the client device may include: a processor 601, a non-volatile computer readable memory 602, a display 603, a network communications interface 604, an I/O interface 605, and a camera 606. These components communicate by using a bus 607.

In one embodiment, multiple program components, for example, an operating system 608, an I/O component 609, a network communications component 610, and/or an application component 611, are stored in the memory 602.

The processor 601 may read data processing program included in the application component 611 in the memory 602 to execute functional applications of a terminal device and data processing. There may be one or more processors 601 in this embodiment, and the processor 601 may be a CPU, a processing component, an ASIC, a logic component, a programmable gate array, or the like.

The operating system 608 includes, but is not limited to: an Android operating system, a Windows operating system, an Apple iOS operating system, an Apple Mac OS operating system, and the like.

An application 611 may include functional components in the apparatus shown in FIG. 4 and form a corresponding computer executable instruction set 612 and a corresponding metadata and heuristic algorithm 613. These computer executable instruction sets may be executed by the processor 601 and complete the method shown in FIG. 1 and functions of the apparatus shown in FIG. 4.

In one embodiment, the network communications interface 604 and the network communications component 610 cooperate to complete receiving and sending of network signals of the terminal device, including transmission of information card image data with the server and exchange of network data.

The display 603 includes a display panel, configured to complete input and display of related information, including display of an information-card-placing-area-box and the obtained information card image.

In this embodiment of this application, the I/O interface 605 is connected to the camera 606. In addition, there is another I/O interface, configured to connect to another input/output device, such as a touch panel (for example, a touch screen). The I/O interface 605 sends to the I/O component 609 the information card image data received from the camera 606 for processing.

The application component 611 may include functional components of a dashed line part in the apparatus shown in FIG. 4. Alternatively, the application component 611 may include functional components of a solid line part in the apparatus shown in FIG. 4. Alternatively, the application component 611 may include functional components of both a dashed line part and a solid line part in the apparatus shown in FIG. 4. These functional components may be computer executable instructions that are executed by the processor 601. An image obtaining device 407 may be configured to obtain, by using the I/O component 609, the information card image data collected by the camera 606.

Figure 7:
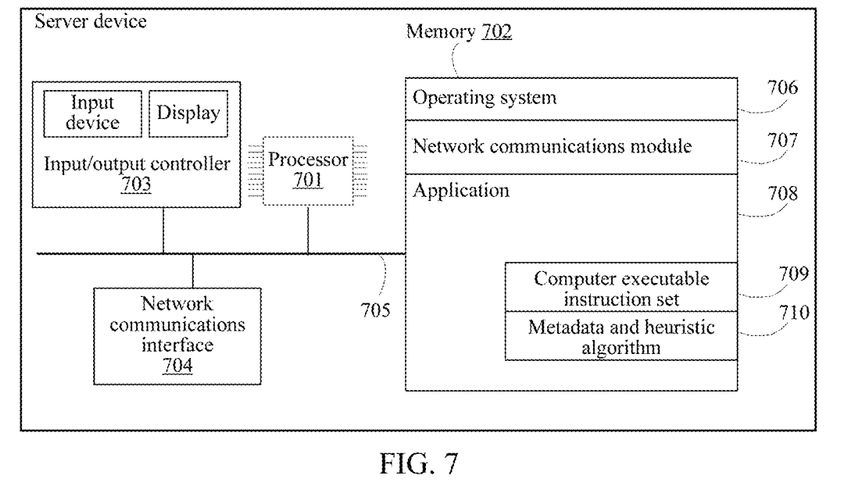
FIG. 7 is a schematic structural diagram of a server device according to embodiments of this application.

FIG. 7 is a schematic structural diagram of a server device according to an embodiment of this application. As shown in FIG. 7, the server device may include: a processor 701, a non-volatile computer readable memory 702, an input/output controller 703, and a network communications interface 704. These components communicate by using a bus 705.

In this embodiment, multiple program components, for example, an operating system 706, a network communications component 707, and an application component 708, are stored in the memory 702.

The processor 701 may read components (not shown) in the application in the memory 702 to execute functional applications of a server device and data processing. There may be one or more processors 701 in this embodiment, and the processor 701 may be a CPU, a processing component, an ASIC, a logic component, a programmable gate array, or the like.

The input/output controller 703 includes a display and an input device, configured to complete input, output, display, and the like of related data.

The operating system 706 includes but is not limited to: an Android operating system, a Symbian operating system, a Windows operating system, a Linux operating system, and the like.

The application component 708 may include functional components of a solid line part in the apparatus shown in FIG. 4. These functional components may be a computer executable instruction set 709 that is executed by the processor 701 and a corresponding metadata and heuristic algorithm 710.

In this embodiment, the network communications interface 704 and the network communications component 706 cooperate to complete receiving and sending of network signals of the server device, including transmission of information card image data with the client device and exchange of network data.

Therefore, in the embodiments of present application, two endpoints of a line segment corresponding to each of four sides of a photographed and deformed information card may be obtained by performing line detection in an information card image. According to two endpoints of a line segment corresponding to each side, a linear equation corresponding to the side may be obtained, so that coordinates of the four intersection points may be obtained according to linear equations corresponding to the four sides. A perspective transformation matrix may be obtained by mapping the coordinates of the four intersection points to a rectangular box of the information card, so that perspective transformation may be performed, according to the perspective transformation matrix, on image content encircled by four straight lines represented by the four linear equations. At this point, the image content of the photographed and deformed information card is transformed into image content of an information card. Therefore, by means of the technical solutions in the embodiments of this application, the requirements on user cooperation may be reduced because automatic correction of the deformed image may be implemented. Then gradient template matching is performed, by using a gradient template that is produced according to layout of information content on the information card, on the transformed image content, whether the image content is a correct information card may be determined according to a matching result. Therefore, in the technical solutions of an exemplary embodiment of present application, only gradient matching needs to be performed. Therefore, entire image content does not need to be scanned for matching, and this process is simplified with fast speed.

The above descriptions are merely preferred embodiments of this application, but are not intended to limit this application. Any modification, equivalent replacement, or improvement made within the spirit and principle of this application shall all fall within the protection scope of this application.

What is claimed is:

1. A method for detecting an information card in an image, comprising:
performing a line detection in an information card image, to obtain two endpoints of a line segment corresponding to each of four sides of the information card;
generating, according to the two endpoints of the line segment corresponding to each side, a linear equation corresponding to the side;
obtaining coordinates of four intersection points according to the linear equations corresponding to the four sides of the information card;
mapping the coordinates of the four intersection points to four corners of a rectangular box of the information card, to obtain a perspective transformation matrix;
performing perspective transformation on image content encircled by four straight lines represented by the four linear equations according to the perspective transformation matrix to provide transformed image content;
obtaining a prestored template according to a layout of information content on a standard information card, the template comprising a first standard area corresponding to a specified information content area and a second standard area corresponding to a specified non-information area; and
using the template to match with the transformed image content and determining, according to a matching result, whether the image content is a correct information card, comprising:
determining, in proportion, a first to-be-evaluated area in the transformed image content according to the first standard area of the template;
determining, in proportion, a second to-be-evaluated area in the transformed image content according to the second standard area of the template;
calculating an average value of all gradient values for pixels within the first to-be-evaluated area in the transformed image content, to obtain a first average gradient value;
calculating an average value of all gradient values for pixels within the second to-be-evaluated area in the transformed image content, to obtain a second average gradient value; and
determining that the information card image contains the correct information card when the first average gradient value is greater than the first gradient threshold and the second average gradient value is less than the second gradient threshold, and
determining that the information card image does not contain a correct information card when the first average gradient value is not greater than the first gradient threshold, or when the second average gradient value is not less than the second gradient threshold.

2. The method according to claim 1, wherein
the first gradient threshold is determined according to an average gradient of the first standard area, and
the second gradient threshold is determined according to an average gradient of the second standard area.

3. The method according to claim 2, wherein:
the template comprises multiple first standard areas corresponding to a plurality of specified information content areas and multiple second standard areas corresponding to a plurality of specified non-information areas.

4. The method according to claim 3, wherein:
the first gradient threshold is determined according to an average gradient of the multiple first standard areas; and
the second gradient threshold is determined according to an average gradient of the multiple second standard areas.

5. The method according to claim 3, wherein
one of the multiple first standard areas is adjacent to one of multiple second standard areas.

6. The method according to claim 1, further comprising:
obtaining the information card image under a guidance of an information-card-placing-area-box, wherein the information-card-placing-area-box is configured to instruct a user to place an information card in the area box for photographing; and
wherein performing the line detection in the information card image comprises:
performing the line detection in the information card image within a predetermined range of each side corresponding to the information-card-placing-area-box.

7. The method according to claim 1, further comprising:
generating, on a user interface, an information-card-placing-area-box configured to instruct a user to place the information card in the area box for photographing; and
obtaining the information card image,
wherein performing the line detection in the information card image comprises:
performing the line detection in the information card image within a predetermined range of each side corresponding to the information-card-placing-area-box.

8. The method according to claim 1, wherein:
the standard information card corresponding to the prestored template is a specified type of card; and
determining that the information card image contains the correct information card indicates the image content of the information card image belongs to the specific type of card.

9. The method according to claim 8, wherein the specific type of card is one of a social security card, a health insurance card, a driving license, or an identity card.

10. An apparatus for detecting an information card in an image, comprising:
a memory; and
a processor coupled to the memory and configured for:
performing a line detection in an information card image, to obtain two endpoints of a line segment corresponding to each of four sides of the information card;
generating, according to the two endpoints of the line segment corresponding to each side, a linear equation corresponding to the side;
obtaining coordinates of four intersection points according to the linear equations corresponding to the four sides of the information card;
mapping the coordinates of the four intersection points to four corners of a rectangular box of the information card, to obtain a perspective transformation matrix;
performing perspective transformation on image content encircled by four straight lines represented by the four linear equations according to the perspective transformation matrix to provide transformed image content;
obtaining a prestored template according to a layout of information content on a standard information card, the template comprising a first standard area corresponding to a specified information content area and a second standard area corresponding to a specified non-information area; and using the template to match with the transformed image content and determining, according to a matching result, whether the image content is a correct information card, comprising:
determining, in proportion, a first to-be-evaluated area in the transformed image content according to the first standard area of the template;
determining, in proportion, a second to-be-evaluated area in the transformed image content according to the second standard area of the template;
calculating an average value of all gradient values for pixels within the first to-be-evaluated area in the transformed image content, to obtain a first average gradient value;
calculating an average value of all gradient values for pixels within the second to-be-evaluated area in the transformed image content, to obtain a second average gradient value; and
determining that the information card image contains the correct information card when the first average gradient value is greater than the first gradient threshold and the second average gradient value is less than the second gradient threshold, and
determining that the information card image does not contain a correct information card when the first average gradient value is not greater than the first gradient threshold, or when the second average gradient value is not less than the second gradient threshold.

11. The apparatus according to claim 10, wherein:
the first gradient threshold is determined according to an average gradient of the first standard area, and
the second gradient threshold is determined according to an average gradient of the second standard area.

12. The apparatus according to claim 10, wherein the processor is further configured for:
obtaining the information card image under a guidance of an information-card-placing-area-box, wherein the information-card-placing-area-box is configured to instruct a user to place an information card in the area box for photographing; and
wherein performing the line detection in the information card image comprises:
performing the line detection in the information card image within a predetermined range of each side corresponding to the information-card-placing-area-box.

13. The apparatus according to claim 10, wherein the processor is further configured for:
generating, on a user interface, an information-card-placing-area-box configured to instruct a user to place the information card in the area box for photographing; and
obtaining the information card image,
wherein performing the line detection in the information card image comprises:
performing the line detection in the information card image within a predetermined range of each side corresponding to the information-card-placing-area-box.

14. A system for detecting an information card in an image, comprising:
a server device comprising the apparatus according to claim 10, and
a client device configured to provide the information card image to the server device.

15. The system according to claim 14, wherein:
the client device is configured to generate, on a user interface, an information-card-placing-area-box, configured to instruct a user to place an information card in the area box for photographing; and obtain the information card image under the guidance of the information-card-placing-area-box; and
the server device is configured to perform the line detection in the information card image within the predetermined range of each side corresponding to the information-card-placing-area-box.

16. A non-transitory computer-readable storage medium containing computer-executable program instructions for, when executed by a processor, performing a method for detecting an information card in an image, the method comprising:
performing a line detection in an information card image, to obtain two endpoints of a line segment corresponding to each of four sides of the information card;
generating, according to the two endpoints of the line segment corresponding to each side, a linear equation corresponding to the side;
obtaining coordinates of four intersection points according to the linear equations corresponding to the four sides of the information card;
mapping the coordinates of the four intersection points to four corners of a rectangular box of the information card, to obtain a perspective transformation matrix;
performing perspective transformation on image content encircled by four straight lines represented by the four linear equations according to the perspective transformation matrix to provide transformed image content;
obtaining a prestored template according to a layout of information content on a standard information card, the template comprising a first standard area corresponding to a specified information content area and a second standard area corresponding to a specified non-information area; and
using the template to match with the transformed image content and determining, according to a matching result, whether the image content is a correct information card, comprising:
determining, in proportion, a first to-be-evaluated area in the transformed image content according to the first standard area of the template;
determining, in proportion, a second to-be-evaluated area in the transformed image content according to the second standard area of the template;
calculating an average value of all gradient values for pixels within the first to-be-evaluated area in the transformed image content, to obtain a first average gradient value;
calculating an average value of all gradient values for pixels within the second to-be-evaluated area in the transformed image content, to obtain a second average gradient value; and
determining that the information card image contains the correct information card when the first average gradient value is greater than the first gradient threshold and the second average gradient value is less than the second gradient threshold, and
determining that the information card image does not contain a correct information card when the first average gradient value is not greater than the first gradient threshold, or when the second average gradient value is not less than the second gradient threshold.

17. The non-transitory computer-readable storage medium according to claim 16, wherein
the first gradient threshold is determined according to an average gradient of the first standard area, and
the second gradient threshold is determined according to an average gradient of the second standard area.

18. The non-transitory computer-readable storage medium according to claim 16, wherein the method further comprises:
- obtaining the information card image under a guidance of an information-card-placing-area-box, wherein the information-card-placing-area-box is configured to instruct a user to place an information card in the area box for photographing; and
- wherein performing the line detection in the information card image comprises:
- performing the line detection in the information card image within a predetermined range of each side corresponding to the information-card-placing-area-box.

19. The non-transitory computer-readable storage medium according to claim 16, wherein the method further comprises:
- generating, on a user interface, an information-card-placing-area-box configured to instruct a user to place the information card in the area box for photographing; and
- obtaining the information card image,
- wherein performing the line detection in the information card image comprises:
- performing the line detection in the information card image within a predetermined range of each side corresponding to the information-card-placing-area-box.

* * * * *